US008128800B2

(12) United States Patent  
Seo et al.

(10) Patent No.: US 8,128,800 B2
(45) Date of Patent: Mar. 6, 2012

(54) METHOD OF MANUFACTURING LIGHT GUIDE PANEL WITH PATTERN ACCURACY

(75) Inventors: Jeong Min Seo, Seongnam-si (KR); Young Bee Chu, Yongin-si (KR); Dong Cheol Kim, Suwon-si (KR); Jong Nam Lee, Angyang-si (KR)

(73) Assignee: Samsung Electronics Co., Ltd. (KR)

( * ) Notice: Subject to any disclaimer, the term of this patent is extended or adjusted under 35 U.S.C. 154(b) by 1111 days.

(21) Appl. No.: 11/951,978

(22) Filed: Dec. 6, 2007

(65) Prior Publication Data

US 2008/0136050 A1 Jun. 12, 2008

(30) Foreign Application Priority Data

Dec. 7, 2006 (KR) .................. 10-2006-0123855

(51) Int. Cl.
*C25D 5/02* (2006.01)
(52) U.S. Cl. ..................................... 205/122
(58) Field of Classification Search ............ 205/122, 205/127
See application file for complete search history.

(56) References Cited

U.S. PATENT DOCUMENTS

| 6,027,630 | A * | 2/2000 | Cohen | 205/135 |
| 6,661,479 | B2 | 12/2003 | Taniguchi et al. | |
| 7,018,782 | B2 | 3/2006 | Chen | |
| 2005/0023433 | A1 * | 2/2005 | Ishitaka et al. | 249/134 |

FOREIGN PATENT DOCUMENTS

| JP | 2002210744 | 7/2002 |
| JP | 2006053371 | 2/2006 |
| JP | 2006082536 | 3/2006 |
| JP | 2006218829 | 8/2006 |
| KR | 1020030089058 | 11/2003 |
| KR | 1020050038721 | 4/2005 |
| KR | 10-495230 | 6/2005 |
| KR | 1020060094306 | 8/2006 |

OTHER PUBLICATIONS

English Language Abstract KR 1020030088743, Nov. 20, 2003, corresponding to KR 10-0495230, Jun. 3, 2005.

* cited by examiner

*Primary Examiner* — Luan Van
(74) *Attorney, Agent, or Firm* — Innovation Counsel LLP

(57) ABSTRACT

A method of manufacturing a mold for producing a light guide panel and a method of manufacturing the light guide panel using the mold are presented. The mold is made by manufacturing a pattern master on which a fine pattern is formed. A side mold for forming a light-receiving surface of a light guide panel is immersed in an electrolyte containing metal ions, along with the pattern master. A voltage is applied to the electrolyte and the side mold such that the fine pattern on the pattern master is transferred to the side mold with the metal ions in the electrolyte, forming a prism pattern forming portion on the side mold. The prism pattern is formed on a light-receiving portion of the light guide panel using the side mold thus prepared. The shape accuracy and surface accuracy of the prism pattern are improved by using the presented method.

14 Claims, 10 Drawing Sheets

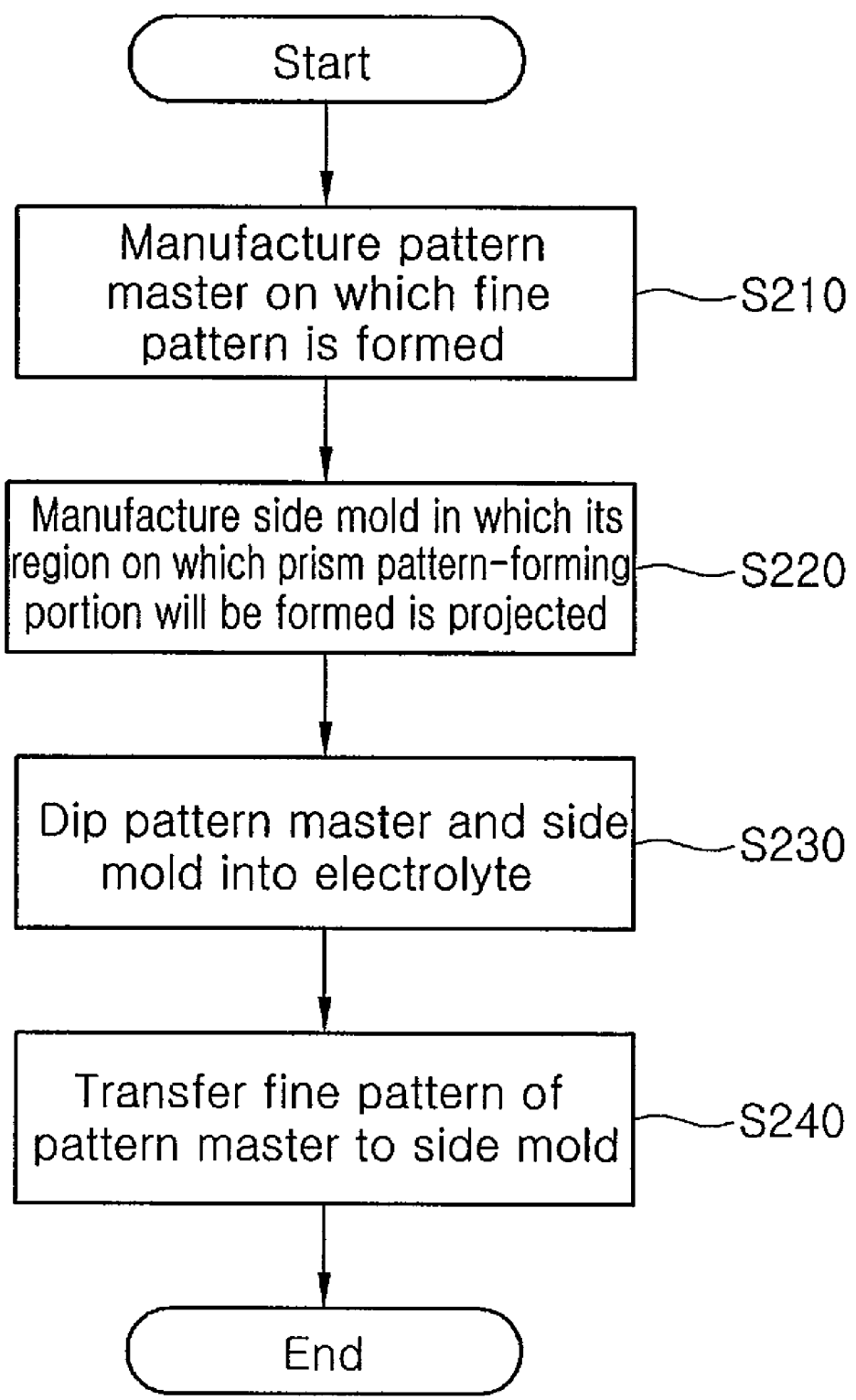

METHOD OF MANUFACTURING LIGHT GUIDE PANEL WITH PATTERN ACCURACY

CROSS-REFERENCE TO RELATED APPLICATION(S)

This application claims priority from Korean Patent Application No. 10-2006-0123855 filed on Dec. 7, 2006, the content of which is incorporated by reference herein in its entirety.

BACKGROUND OF THE INVENTION

1. Technical Field

The present invention relates to a method of manufacturing a light guide panel, and more particularly to a method of manufacturing a mold for the light guide panel of a backlight unit and a method of manufacturing a light guide panel.

2. Description of the Related Art

Liquid crystal displays (LCDs) are light-receiving-type flat panel display devices. Since LCDs do not emit light themselves, they use light from the outside to display the desired image. The light for image display is often provided by a backlight unit that is installed behind the LCD to emit light.

Backlight units are classified into a direct-light type backlight unit and an edge-light type backlight unit depending on the arrangement form of light sources. According to the edge-light type backlight unit, light is emitted from a light source installed along an edge of a light guide panel, which installed under a liquid crystal display panel. The emitted light is transmitted to the liquid crystal display panel through the light guide panel. The light guide panel converts the light from the light source into a surface light and emits it in a vertical direction. To help this conversion, a scattering pattern or hologram pattern for efficiently converting the light from the light source into the surface light may be formed on the light guide panel.

A line light source and a point light source can be used as the light source in the edge-light type backlight unit. Light emitting diodes (LEDs) are popular choices as a light source in a display device when slimness and light weight are important characteristics.

Consumer demands for improved optical characteristics such as luminance, uniformity and color sensitivity (among other characteristics) in backlight units are continuously increasing. Of the different optical characteristics, luminance and uniformity depend a lot on functional sheets and a light guide panel. In order to improve luminance and remove dark portions, a prism pattern is formed on light-receiving portions of the light guide panel on which light from a light source is incident.

In order to form such a prism pattern, a fine prism pattern is processed on a side mold for the light guide panel. Processing methods such as V-cutting, grinding, electric discharge machining, wire electric discharge machining, and milling may be used in forming the fine prism pattern. Shape or surface accuracy of the prism pattern directly affects the optical characteristics of the light guide panel since the prism pattern contacts the adjacent LED. However, the aforementioned processing methods cannot produce the desired shape or surface accuracy.

Recently, an ultra-precision micromachining technology has been developed that uses a MEMS (Micro Electro Mechanical System) technology. This ultra-precision micromachining technology bombines the MEMS technology with an optical lithography technology, so that an accuracy grade of the ultra-precision micromachining technology is increased to a nano-order level. However, since such a technology is mainly applied to a polymer based resin, it is difficult to directly apply the technology to prism pattern processing of the light-receiving portions of the light guide panel.

SUMMARY OF THE INVENTION

The present invention provides a method of manufacturing a mold for producing a light guide panel. The mold of the invention is capable of forming a prism pattern on a light-receiving portion of the light guide panel with improved accuracy. A method of manufacturing a light guide panel using the mold is also presented.

In one aspect, the present invention is a method of manufacturing a mold for producing a light guide panel. The method entails manufacturing a pattern master on which a fine pattern is formed; immersing the pattern master and a side mold for forming a light-receiving surface of the light guide panel in an electrolyte; and applying a predetermined voltage to the electrolyte and the side mold, thereby transferring the fine pattern of the pattern master to the side mold with metal ions in the electrolyte.

The fine pattern of the pattern master is the same pattern as a prism pattern that is to be formed on the light-receiving surface of the light guide panel.

The fine pattern of the pattern master may be formed to have a triangular or semicircular cross-section.

Manufacturing the pattern master may entail: forming a photosensitive film pattern including a plurality of triangular protrusions in a predetermined region on a substrate; forming a first resin layer of a uniform thickness on t the photosensitive film pattern; forming a second resin layer such that the second resin layer has a flat surface; and separating the first resin layer after removing the photosensitive film pattern and the substrate from the second resin layer.

Forming the photosensitive film pattern may including a plurality of triangular protrusions may entail: depositing a photosensitive film on the substrate; placing a patterned mask on the photosensitive film; irradiating the patterned mask at a first angle with respect to an orthogonal axis to the surface of the photosensitive film; irradiating the patterned mask at a second angle with respect to the orthogonal axis; and applying an X-ray developer to the photosensitive film.

Alternatively, manufacturing the pattern master may entail: forming a resin layer on a substrate; forming a photosensitive film pattern for exposing the resin layer in a predetermined region on the resin layer; etching the resin layer using the photosensitive film pattern as a mask to form a plurality of semicircle-shaped grooves; and removing the photosensitive film pattern.

A region of the side mold to which the fine pattern of the pattern master is transferred may be a protrusion from another surface.

A region of the side mold around the regions to which the fine pattern of the pattern master is transferred and the voltage is applied may be insulated.

In another aspect, the present invention is a method of manufacturing a light guide panel that entails: immersing a pattern master and a side mold in an electrolyte, wherein the pattern master has a fine pattern is formed thereon and the side mold is designed to form a light-receiving surface of the light guide panel; forming a prism pattern forming portion on the side mold by applying a predetermined voltage to the electrolyte and the side mold so that the fine pattern of the pattern master transfers to the side mold with metal ions in the electrolyte; assembling the side mold on which the prism pattern forming portion is formed, a top mold for forming an upper surface of the light guide panel and a bottom mold for forming a bottom surface of the light guide panel to form an enclosed cavity; and injecting a resin into the cavity.

The bottom mold may have a pattern that is designed to change a path of incident light, so that the pattern forms on a surface of the light guide panel.

The pattern that changes the path of incident light may be at least one of a scattering pattern, a prism pattern and a hologram pattern.

BRIEF DESCRIPTION OF THE DRAWINGS

The above and other objects, features and advantages of the present invention will become apparent from the following description of preferred embodiments given in conjunction with the accompanying drawings, in which:

FIG. 2 is a process flow chart illustrating a method of manufacturing a mold for producing a light guide panel according to an embodiment of the present invention;

DETAILED DESCRIPTION OF THE EMBODIMENT(S)

Hereinafter, embodiments of the present invention will be described in detail with reference to the accompanying drawings.

Figure 1A:
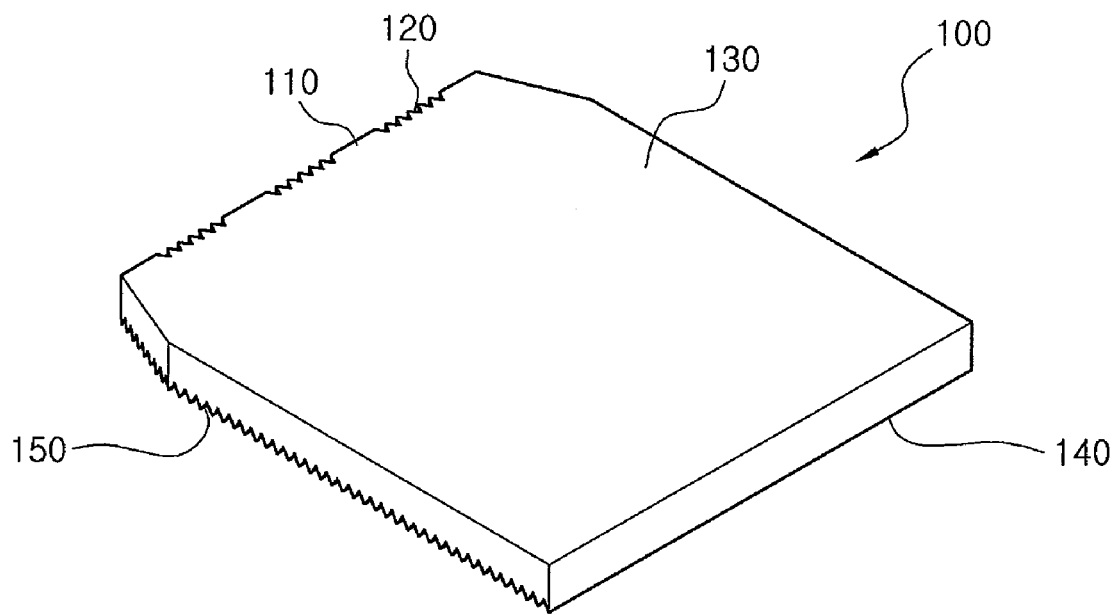
FIGS. 1A and 1B are a perspective view of a light guide panel manufactured according to an embodiment of the present invention and a perspective view of a light-receiving portion thereof, respectively.
Figure 1B:
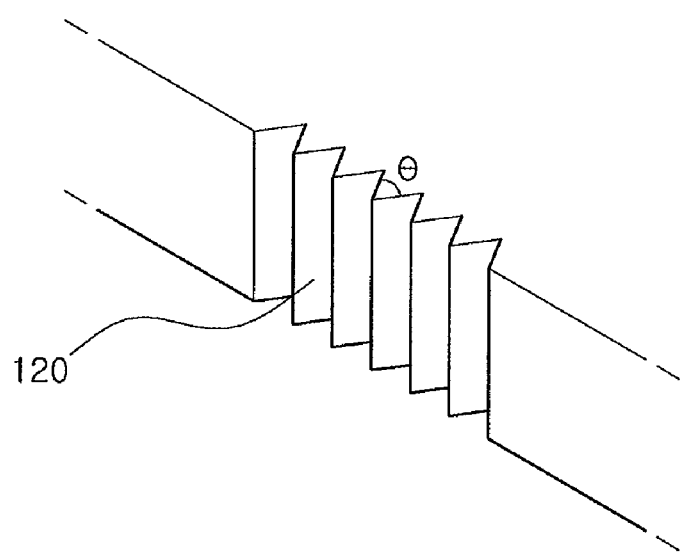

FIG. 1A is a perspective view showing a light guide panel manufactured according to an embodiment of the present invention, and FIG. 1B is a perspective view showing a light-receiving portion of the light guide panel.

Referring to FIGS. 1A and 1B, a light guide panel 100, which converts a point light, e.g., a light emitted from a light emitting diode (LED), into a surface light, is made of a light transmitting material capable of transmitting light. As the light transmitting material, an acryl-based transparent resin with a refractive index of about 1.49 and a specific gravity of about 1.19 is mainly used, and an olefin-based transparent resin with a specific gravity of 1.0 may also be used to reduce the weight of the light guide panel. That is, the light guide panel 100 is made of a transparent material with a predetermined refractive index identical to that of PMMA (polymethyl methacrylate), polyolefin or polycarbonate. The light guide panel 100 generally has a thickness of about 1 to 3 mm. Also, a wedge type light guide panel having the thickness gradually reduced as it gets away from a light-receiving surface 110 through which light is incident may be used in order to reduce the weight of the light guide panel. The size of the light guide panel 100 is determined in accordance with that of a flat image display device, e.g., a liquid crystal display device, in which the light guide panel is employed.

The light-receiving surface 110 of the light guide panel 100 is formed with a plurality of prism patterns 120 that are located near the light sources. In this embodiment, three light sources are used. Hence, three prism patterns 120 are formed, each one close to one of the light sources. Each of the prism patterns 120 may be formed as a series of triangular prisms extending from an upper surface 130 to a bottom surface 140 of the light guide panel 100. It is preferable that each triangular prism of the prism pattern 120 have an angle θ of 90 degrees or more. Depending on the embodiment, light may exit the light guide panel 100 through either or both of the upper surface 130 and the bottom surface 140. For convenience of description, the upper surface 130 is herein referred to as the light-emitting surface in this embodiment of the present invention.

In order for light to exit the light guide panel 100 through the light-emitting surface, the angle of incidence (i.e., the angle between the direction from which light reaches the light-emitting surface and an imaginary line orthogonal to the light-emitting surface) should be smaller than a critical angle. Therefore, among the light rays that are incident on the light guide panel 100, the light rays that reach the surface at an angle of incidence that is smaller than the critical angle are transmitted through the light-emitting surface to escape the light guide panel 100, whereas other light rays are totally internally reflected to propagate back into the light guide panel 100. Light rays that are totally internally reflected once do not escape the light guide panel 100 unless their angle of incidence is changed.

A light path conversion means 150 is formed on the bottom surface 140 of the light guide panel 100 to allow more light to escape the light guide panel 100. The light path conversion means 150 converts the path of light through scattering, diffraction or the like, thereby converting the angle of incidence of the light rays. Among the light rays whose paths are converted, those whose new angle of incidence on the light-emitting surface is smaller than the critical angle escape through the light-emitting surface, while the other light rays are reflected internally again. The light rays that are totally internally reflected are repeatedly subjected to a path conversion by the light path conversion means 150 and reach the light-emitting surface until they eventually escape. A scattering pattern for scattering light, a hologram pattern for diffracting light, or a prism pattern for concentrating light can be used as the light path conversion means 150. The light path conversion means 150 can be formed on either or both of the upper surface 130 and the bottom surface 140 of the light guide panel 100. Furthermore, the light path conversion means 150 can be formed by a mold when the light guide panel 100 is molded.

FIG. 2 is a process flow chart illustrating a method of manufacturing a side mold that is used to form a light-receiving surface of a light guide panel according to the embodiment of the present invention.

Figure 3A:
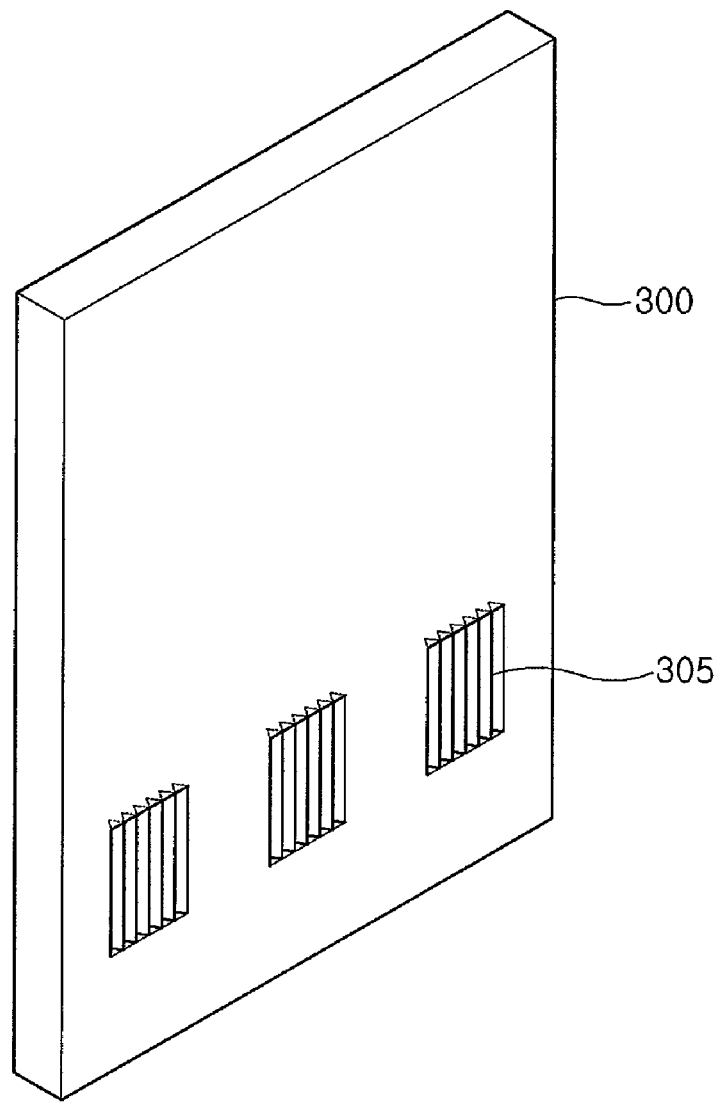
FIGS. 3A and 3B are a perspective view and a sectional view of a pattern master on which a fine pattern is formed.
Figure 3B:
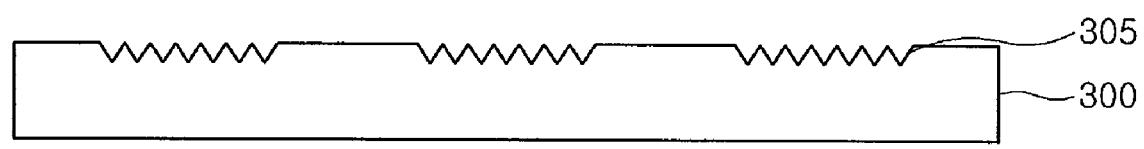

In stage S210 of the process, a pattern master is manufactured. The pattern master is used to form a plurality of prism pattern forming portions on the side mold, which in turn is used for forming the light-receiving surface of the light guide panel. As illustrated in FIGS. 3A and 3B, a pattern master 300 comprises a resin substrate on which fine patterns 305 are formed. The fine patterns 305 are formed as a plurality of prism patterns placed on the light-receiving portions of the light guide panel. The prism patterns may include triangular prisms, for example. In this case, the fine patterns 305 in the shape of the same triangular prisms as that of the prism patterns are formed on the pattern master 300.

Figure 4A:
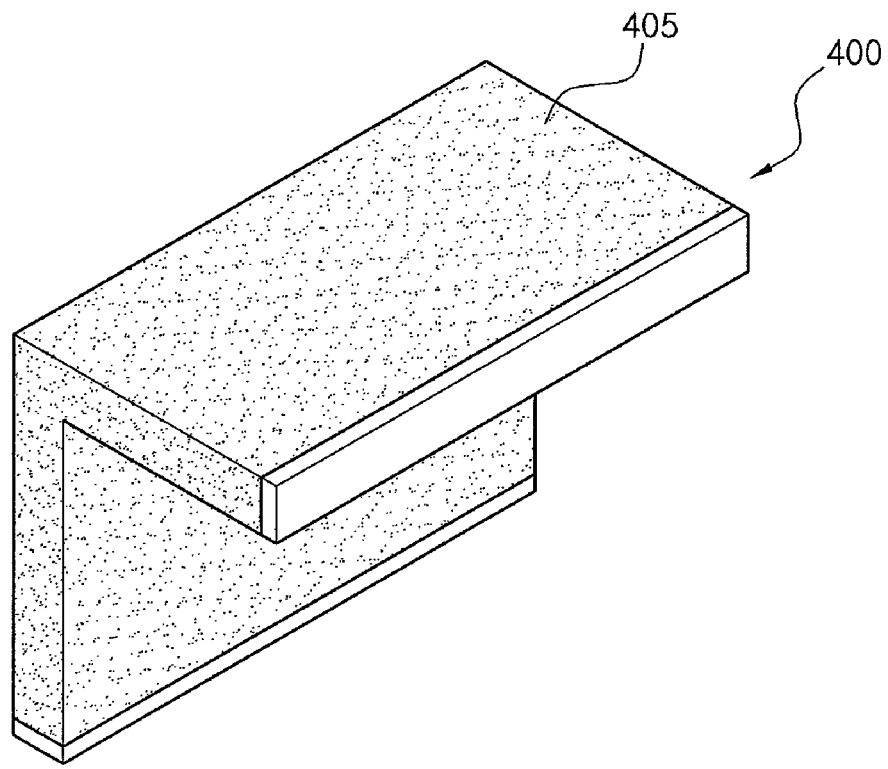
FIGS. 4A and 4B are a perspective view and a side view of a side mold for forming a side surface of the light guide panel.
Figure 4B:
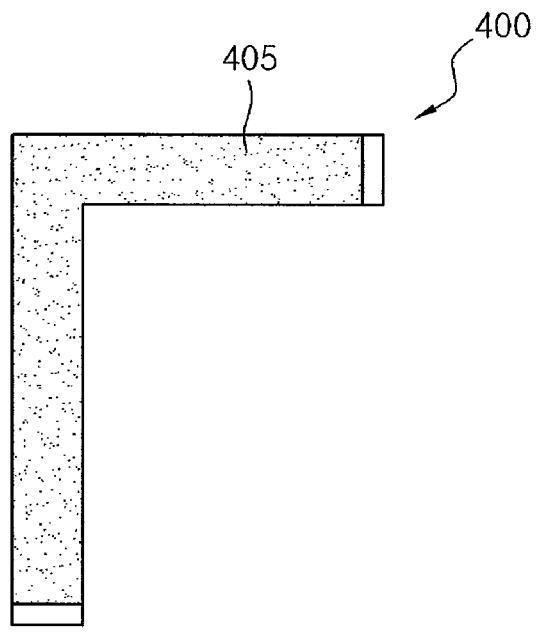

In stage S220, the side mold for forming the side surface of the light guide panel is manufactured. The side mold is manufactured such that the portion of the side mold on which the prism pattern forming portions will be formed protrudes. For instance, the side mold may be formed in an "L" shape, as shown in FIGS. 4A and 4B, with the portion of the side mold on which the prism pattern forming portions will be formed protruding from another surface. Here, the mold is made of a conductive material, and the protruding portion of the mold has the same width and length as the side surface of the light guide panel. Furthermore, the parts of the mold other than where the prism pattern forming portions will be formed and a portion to which a voltage is applied from the outside are coated with a resin 405. The parts coated with the resin 405 are insulated.

Figure 5:
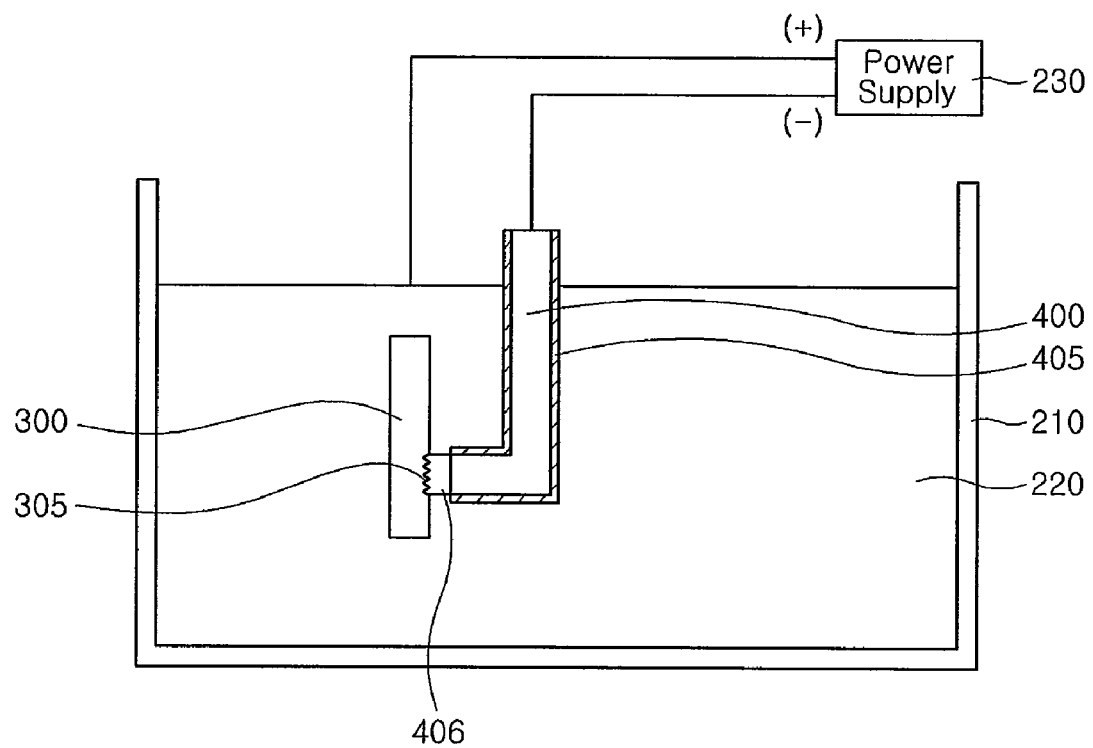
FIG. 5 is a schematic view of an electrolyzer containing an electrolyte into which the pattern master and the side mold are dipped.

In stage S230, the pattern master 300 and the mold 400 are placed in contact. More specifically, the portion of the pattern master 300 with the fine patterns and the portion of the mold 400 on which the prism pattern forming portions will be formed are placed in contact after being dipped in an electrolyzer 210. The electrolyzer 210 holds an electrolyte 220 containing metal ions, as shown in FIG. 5. By placing the pastern master 300 in contact with the mold 400, the fine patterns 305 on the pattern master 300 is brought into contact with or positioned adjacent to the portion of the mold 400 on which the prism pattern forming portions will be formed.

In stage S240, a (+) voltage is applied to the electrolyte 220, and a (−) voltage is applied to the mold 400. Upon application of the voltages, the fine patterns 305 of the pattern master 300 are transferred to the prism pattern forming portions on the mold 400. The metal ions of the electrolyte 220 are laminated on the parts of the mold 400 on which the prism pattern forming portions will be formed. During this process, parts of the mold 400 that is coated with the resin 405 are not laminated. Since the parts of the mold 400 other than where the prism pattern forming portions will be formed is coated with the resin 405, the metal ions precipitated from the pattern master 300 do not laminate the parts around the prism pattern forming portion. Therefore, the fine patterns of the pattern master are transferred to the mold to form the prism pattern forming portions 406.

FIGS. 6A to 6E are sectional views of the pattern master 300 for sequentially illustrating a method of manufacturing the pattern master 300 according to an embodiment of the present invention. As shown, the pattern master has a fine pattern with a cross section of a series of triangles.

Figure 6A:
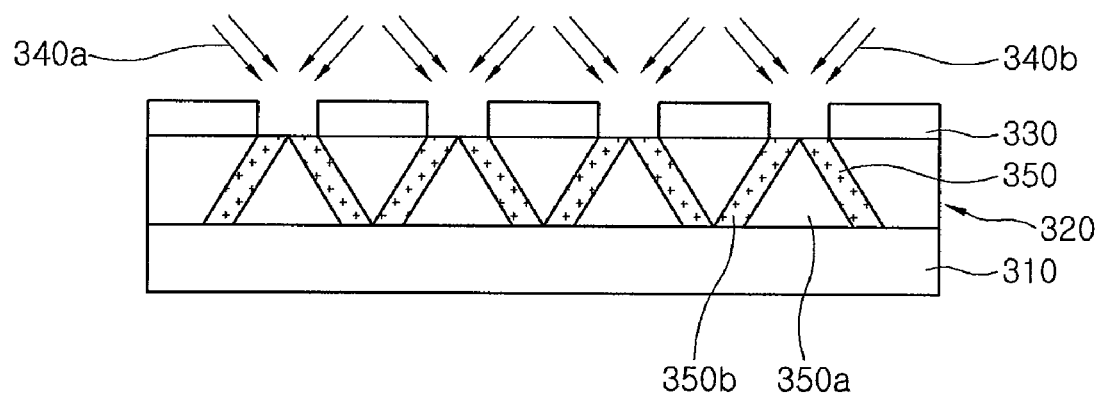
FIGS. 6A to 6E are sectional views of the pattern master for sequentially illustrating a method of manufacturing the pattern master according to the embodiment of the present invention.

Referring to FIG. 6A, a photosensitive film 320 is formed on a glass substrate 310, and a mask 330 with a predetermined pattern is formed on the photosensitive film 320. In order to form inclined surfaces on the photosensitive film 320, a first exposure process is performed by radiating an X ray 340a downward to the right side at a predetermined angle with respect to an imaginary axis that is orthogonal to the glass substrate 310. Following the first exposure process, a second exposure process is performed by radiating an X ray 340b downward to the left side at another predetermined angle with respect to the orthogonal imaginary axis. Since the first and second exposure processes are performed at an angle to the orthogonal axis, the photosensitive film 320 is divided into a non-exposed portion 350a that is not exposed to the X ray and an exposed portion 350b that is thinly exposed to the X ray.

Figure 6B:
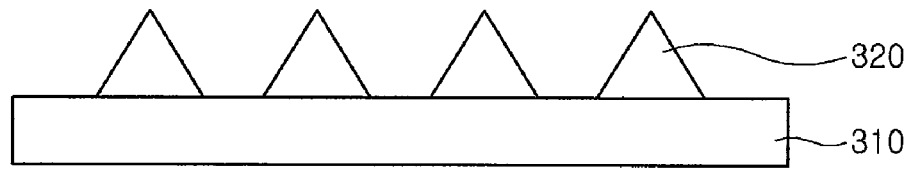

Referring to FIG. 6B, if the photosensitive film 320 is dipped into an X ray developer after removing the mask 330, the exposed portion 350b exposed to the X ray reacts with the developer and is removed. During this process, any non-exposed portion 350a that is positioned on the exposed portion 350b is also removed. Therefore, at the end of the X-ray developer application, triangular portions of the photosensitive film 320 remain on the glass substrate 310. The triangular portions are spaced apart from each other at a predetermined interval.

Figure 6C:
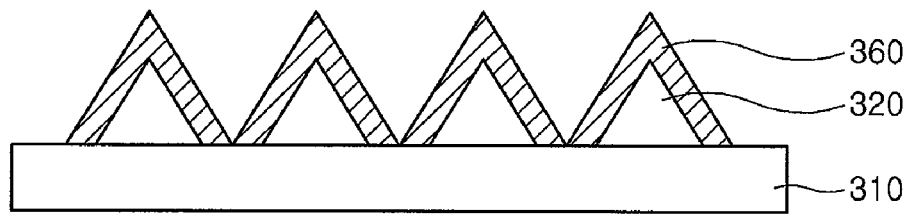

Referring to FIG. 6C, a first resin layer 360 is formed on the triangle-shaped photosensitive film 320. The first resin layer 360 is formed on the triangular photosensitive film 320 to have a uniform thickness, the thickness being approximately half the distance between the triangular portions of the photosensitive film 320. Hence, voids having an upside-down triangular shape are formed between the triangle-shaped portions of the photosensitive film 320.

Figure 6D:
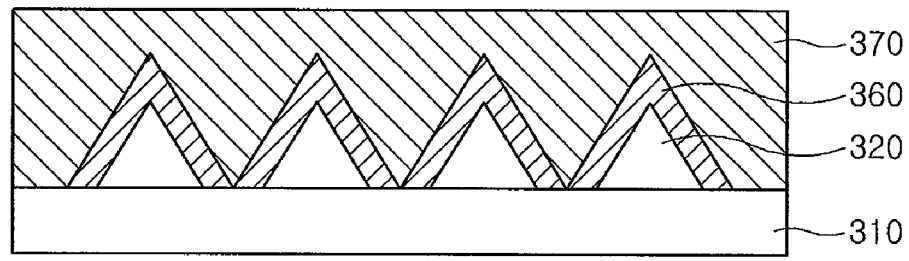

Referring to FIG. 6D, a second resin layer 370 is deposited on the first resin layer 360 with a thickness that is sufficient to cover the first resin layer 360, fill the upside-down triangular voids, and form a flat upper surface. The second resin layer 370 is formed of a material different from that of the first resin layer 360.

Figure 6E:
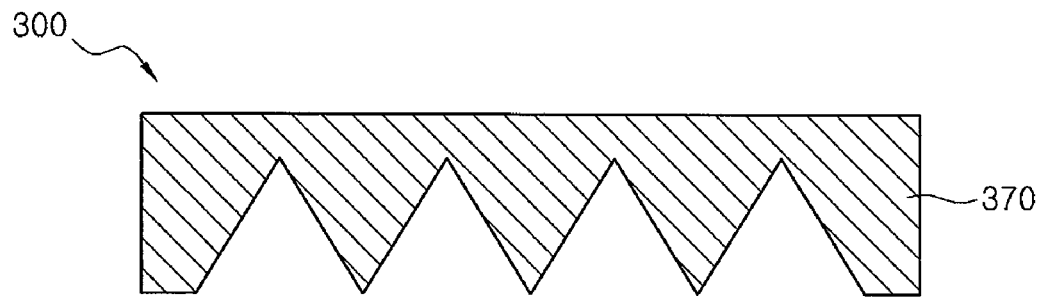

Referring to FIG. 6E, the first resin layer 360 is separated from the second resin layer 370. The manufacture of the pattern master 300 with the fine pattern 305 on the second resin layer 370 is completed by removing the first resin layer 360. Typically, the first resin layer 360 is removed after the glass substrate 310 and the photosensitive film 320.

Figure 7:
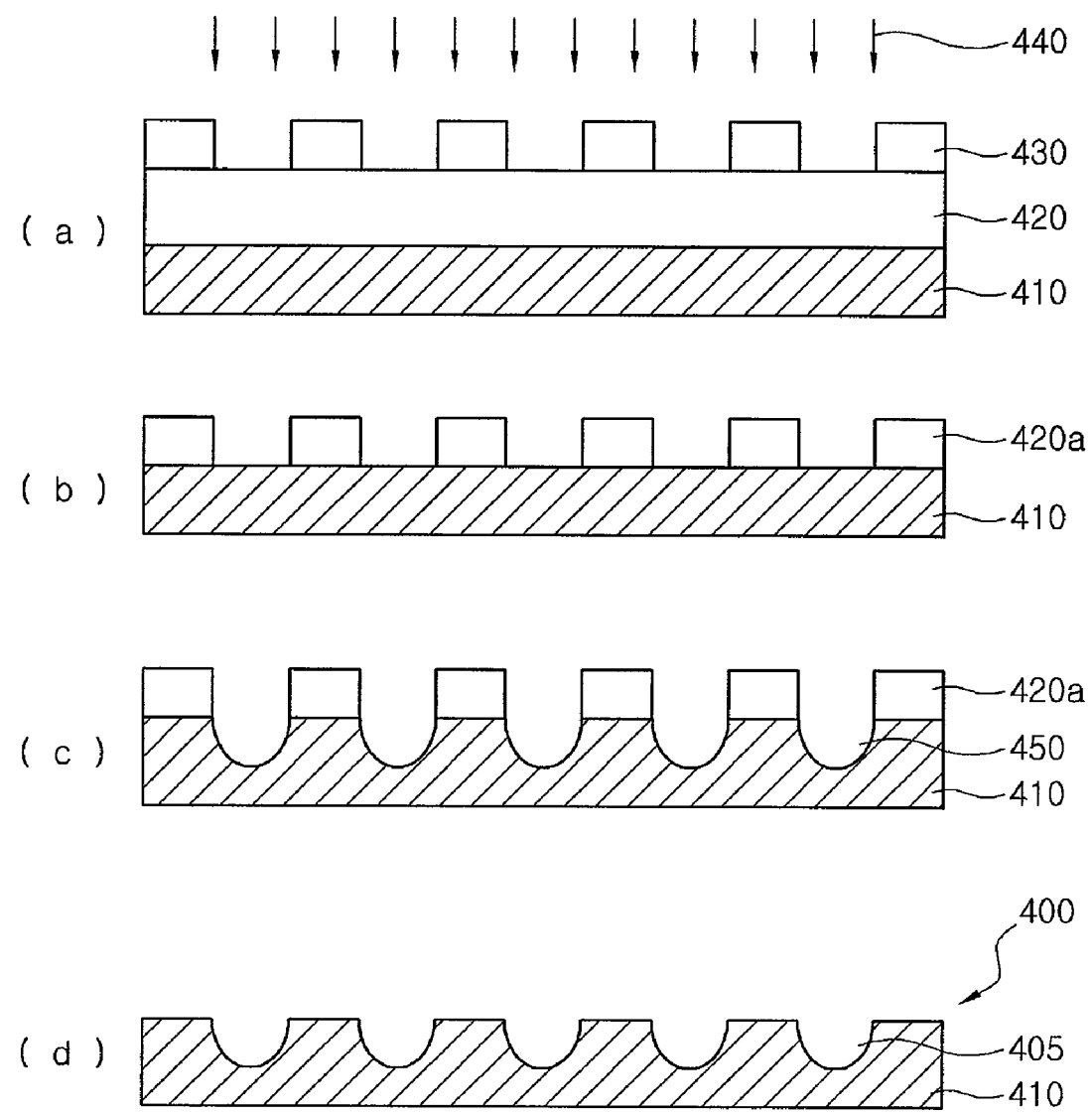
FIG. 7 shows sectional views of the pattern master for sequentially illustrating a method of manufacturing the pattern master according to another embodiment of the present invention.

FIG. 7 shows sectional views of the pattern master for sequentially illustrating a method of manufacturing the pattern master according to another embodiment of the present invention, wherein the pattern master has a fine pattern with a semicircular cross section.

Referring to FIG. 7(a), a photosensitive film 420 is formed on a resin layer 410, and a mask 430 with a predetermined pattern is formed on the photosensitive film 420. After the mask 430 is formed, the photosensitive film 420 is irradiated with X-ray or ultraviolet ray 440.

Referring to FIG. 7(b), after removing the mask 430, the exposed portion of the photosensitive film 420 is dipped into a developer. Accordingly, a photosensitive film pattern 420a for exposing a predetermined region of the resin layer 410 is formed on the resin layer 410.

Referring to FIG. 7(c), the resin layer 410 is etched to a predetermined depth through a wet etching process using the photosensitive film pattern 420a as an etching mask. Accordingly, grooves 450 are formed on the resin layer 410, wherein the grooves 450 have a semicircular base. The sizes of the grooves 450 are adjusted by controlling the process conditions such as the type of etching solution that is used and the etching time.

Referring to FIG. 7(d), the photosensitive film pattern 420a is removed. After the removal, the resin layer 410 having the plurality of semicircular grooves 450 remains. Accordingly, the manufacture of a pattern master 400 with a concave fine pattern 405 having a cross section of a series of semicircles is completed.

The method of manufacturing a pattern master on which a fine pattern is formed is not limited to the foregoing embodiments, but can be implemented with various variations. That is, a fine pattern can be formed by developing a portion of the photosensitive resin after exposing it to light using a triangle-shaped mask on a side surface of the photosensitive resin. A fine pattern of a pattern master having a cross section of a series of triangles or semicircles can be formed by other various methods.

Figure 8A:
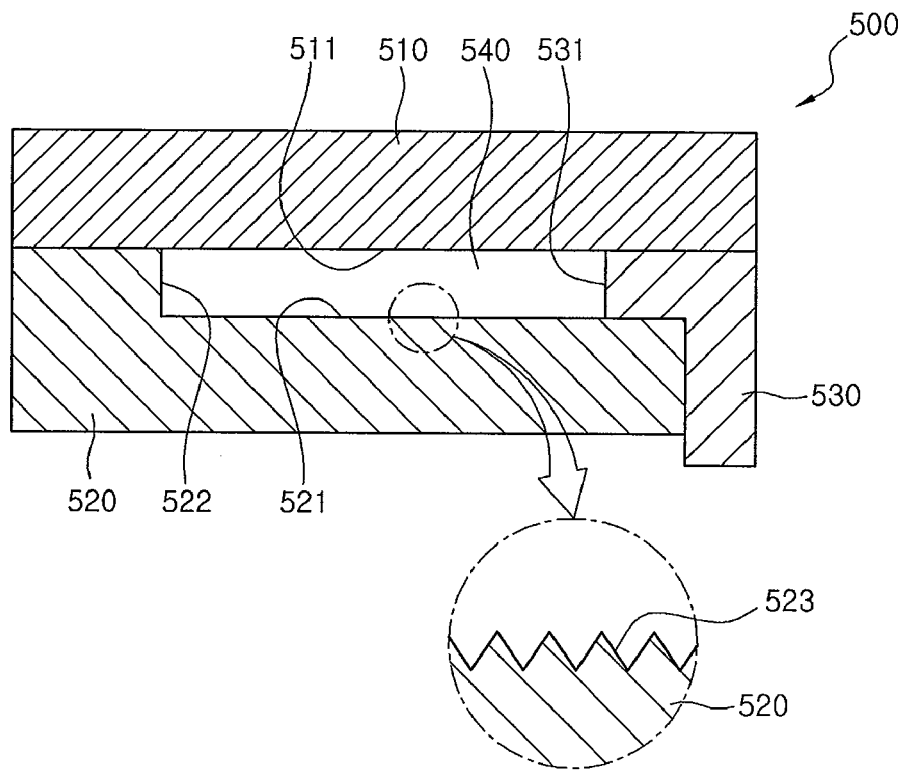
FIG. 8A is a sectional view of assembled molds for producing a light guide panel according to an embodiment of the present invention.
Figure 8B:
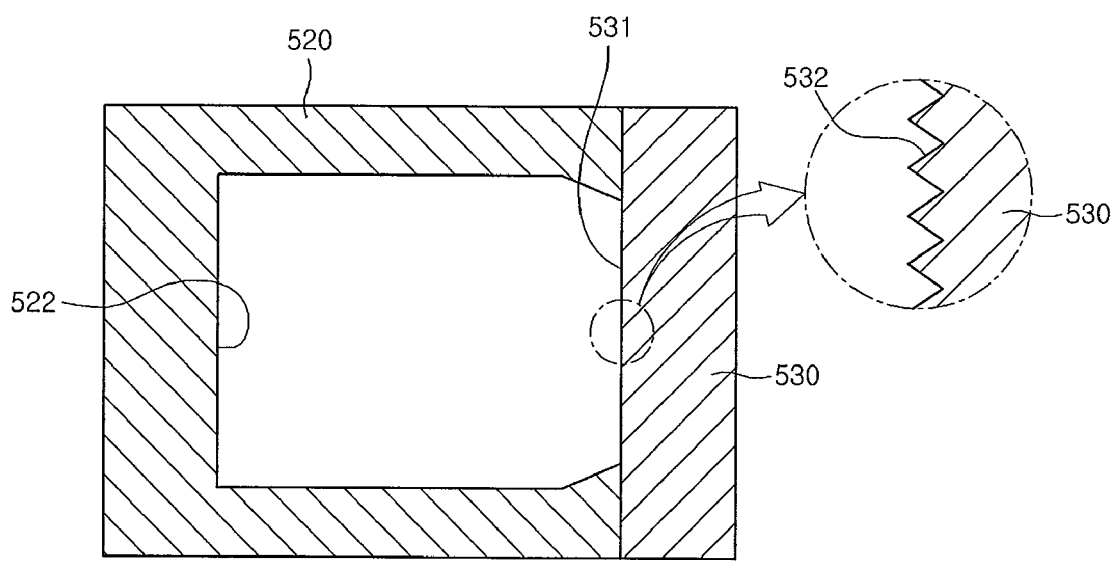
FIG. 8B is a plan view of the assembled molds shown in FIG. 8A with an upper mold removed.

FIG. 8A is a sectional view of assembled molds for producing a light guide panel according to an embodiment of the present invention, and FIG. 8B is a plan view of the assembled molds shown in FIG. 8A with the upper mold removed.

Referring to FIGS. 8A and 8B, a mold assembly 500 for manufacturing a light guide panel according to the embodiment of the present invention includes an upper mold 510 corresponding to an upper surface of the light guide panel, a lower mold 520 corresponding to a bottom surface of the light guide panel, and a side mold 530 corresponding to a light-receiving surface of the light guide panel.

The upper mold 510 has a first surface 511 that forms a light-emitting surface of the light guide panel. The first surface 511 of the upper mold 510 is formed flat like the light-emitting surface of the light guide panel.

The lower mold 520 has a second surface 521 for forming a bottom surface of the light guide panel and a third surface 522 for forming side surfaces other than the light-receiving surface of the light guide panel. The second surface 521 is positioned substantially parallel to the first surface 511 of the upper mold 510 upon assembly. A plurality of projections 523 are formed on the second surface 521 of the lower mold 520. The projections 523 form a light path conversion means on the bottom surface of the light guide panel. The light path conversion means may include a scattering, hologram or prism pattern. The plurality of projections 523 are disposed side to side to be spaced apart from each other along the length of the second surface 521 of the lower mold 520. The respective projections 523 are embossed so that they extend in a width direction of the second surface 521 (i.e., into the page of FIG. 8A). Each of the projections 523 is formed to have a cross section of a triangle or semicircle, depending on the embodiment.

The side mold 530, which is disposed at one end of the upper and lower molds 510 and 520 upon assembly, is coupled to the ends of the upper and lower molds 510 and 520 to form a cavity 540. The side mold 530 has a fourth surface 531 for forming the light-receiving surface of the light guide panel. The fourth surface 531 has a prism pattern forming portion 532 which is imprinted by using the fine pattern on the pattern master as described above. When the upper, lower and side molds 510, 520 and 530 are assembled, the fourth surface 531 is positioned between one end line of the first surface 511 and one end of the second surface 521. Preferably, the ends that sandwich the fourth surface 531 are ends along the longest dimension of the upper and lower molds 510, 520.

Figure 9:
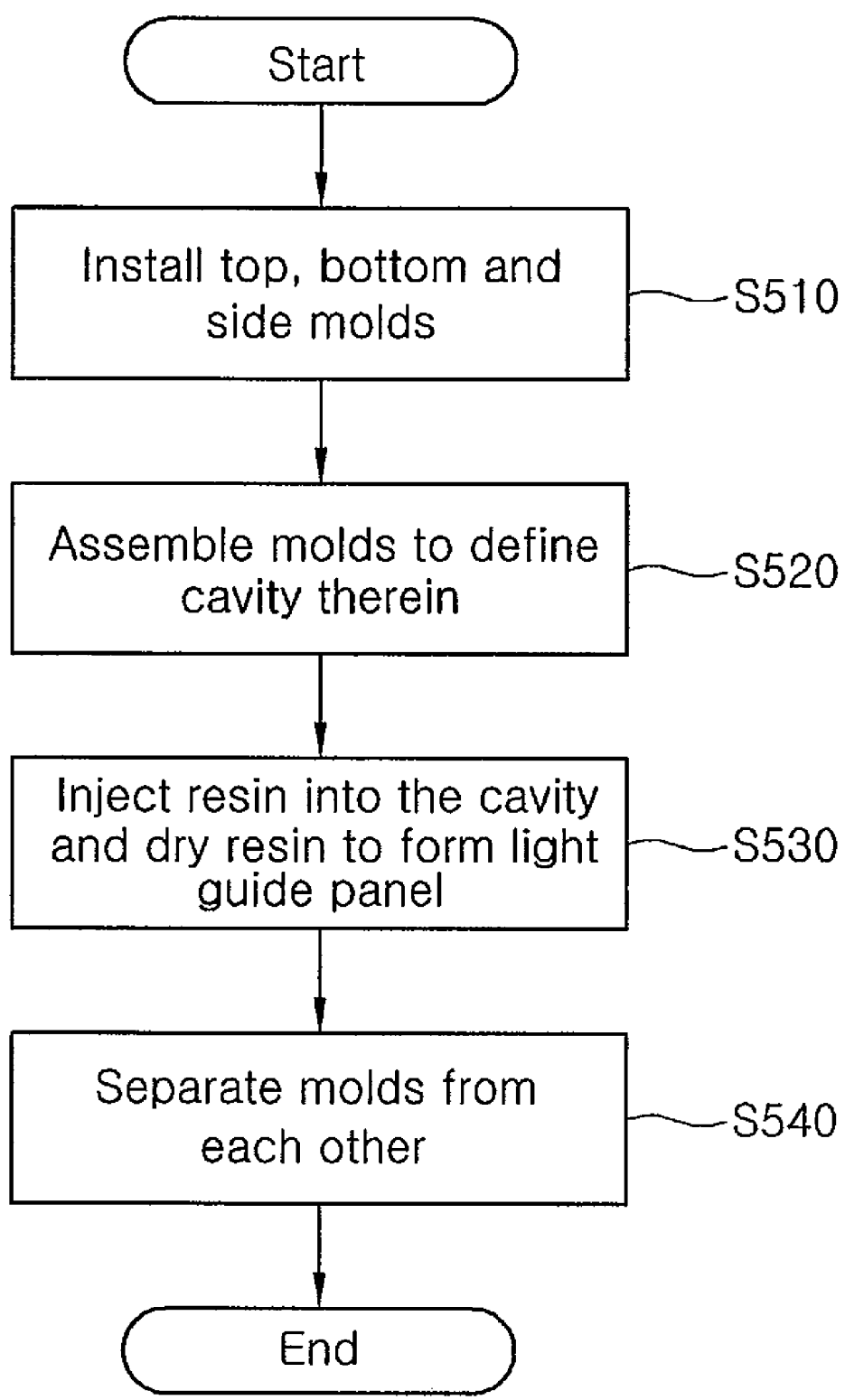
FIG. 9 is a process flow chart illustrating a method of manufacturing a light guide panel using the molds according to an embodiment of the present invention.

FIG. 9 is a process flow chart illustrating a method of forming a light guide panel using the molds illustrated in FIGS. 8A and 8B.

In stage S510, the upper, lower and side molds 510, 520 and 530 are prepared. As described above, the upper mold 510 having the first surface 511, the lower mold 520 having the second and third surfaces 521 and 522, and the side mold 530 having the fourth surface 531 are respectively prepared using an injection molding machine (not shown). As described above, the prism pattern forming portion 532 is formed on the fourth surface 531 of the side mold 530, and the plurality of projections 523 for forming the light path conversion means are formed on the second surface 521 of the lower mold 520.

In stage S520, the upper, lower and side molds 510, 520 and 530 are assembled with one another. A sealed cavity 540 forms when the upper, lower and side molds 510, 520 and 530 are assembled.

In stage S530, the cavity 540 is filled with molten resin by injecting the molten resin through an injection port (not shown). A transparent resin with a predetermined refractive index, such as PMMA (polymethyl methacrylate), polyolefin or polycarbonate, is used as the resin. If a predetermined amount of time elapses after the cavity 540 is completely filled with the resin, the resin is solidified in the cavity 540 so that the light guide panel 100 is formed in the shape of the cavity 540.

In stage S540, the upper, lower and side molds 510, 520 and 530 are separated from one another. During this process, the light guide panel 100 is "freed" from the molds.

The light guide panel 100 is manufactured through injection molding using the molds by the aforementioned method.

Figure 10:
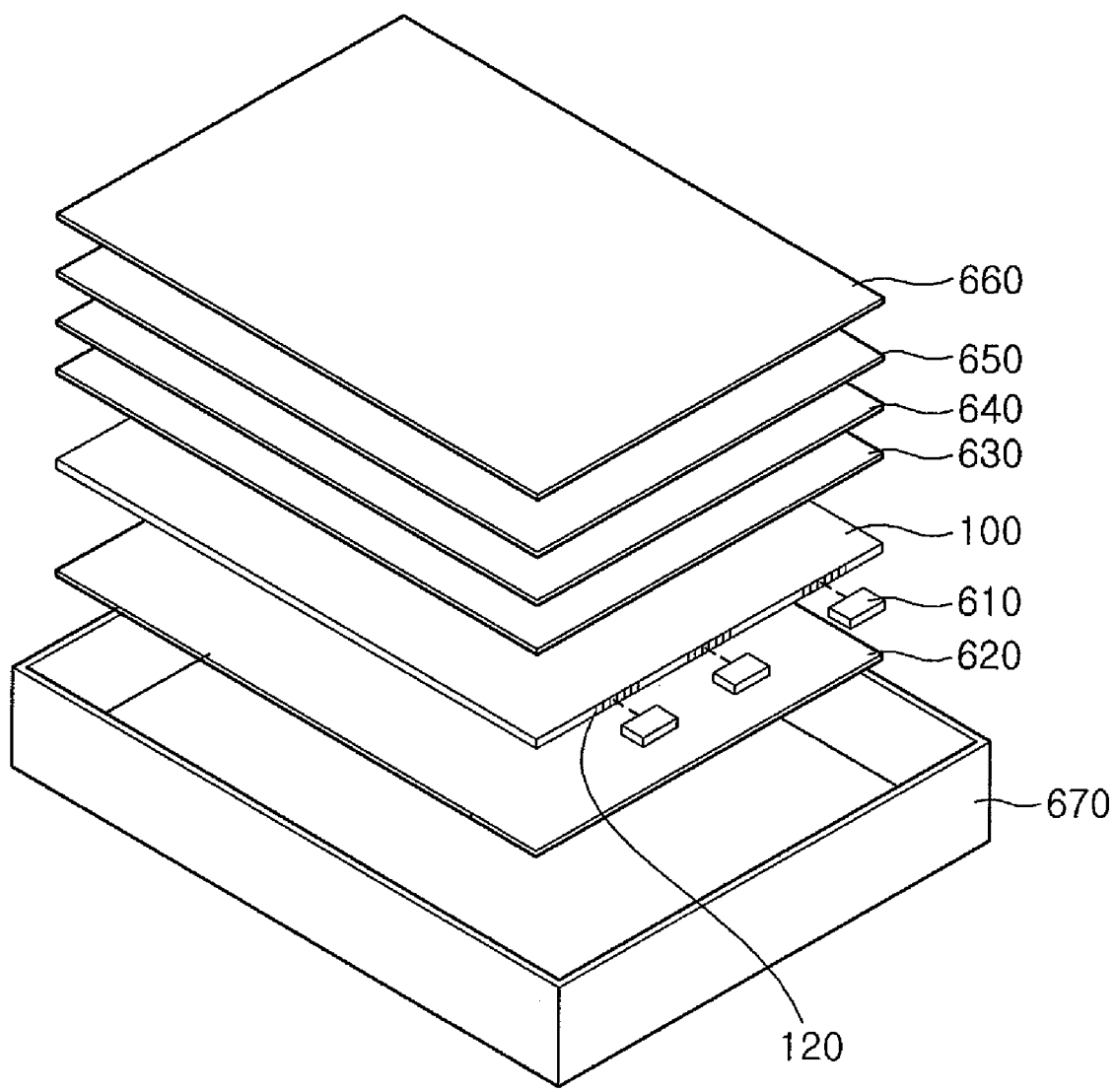
FIG. 10 is a perspective view of a backlight unit having the light guide panel manufactured according to an embodiment of the present invention.

FIG. 10 is a perspective view of a backlight unit having the light guide panel manufactured according to an embodiment of the present invention.

Referring to FIG. 10, a backlight unit according to an embodiment of the present invention includes the light guide panel 100 having the light-receiving portions and the predetermined prism patterns formed as described above, light sources 610 which provide light to the light guide panel 100 and are positioned near the light-receiving portions on which the prism patterns are formed, and a reflection sheet 620 which is installed under the light guide panel 100 to reflect any light that leaks through the bottom surface of the light guide panel. In addition, the backlight unit further comprises a diffusion sheet 630 installed on the light guide panel 100 to uniformly diffuse the light emitted through the light guide panel 100, prism sheets 640 and 650 installed over the diffusion sheet 630 to concentrate the light diffused from the diffusion sheet 630, and a protection sheet 660 installed over the prism sheet 650 to protect the prism sheet 650. Furthermore, the backlight unit comprises a bottom chassis 670 for housing the light guide panel 100, the light sources 610, the reflection sheet 620, the diffusion sheet 630, the prism sheets 640 and 650, and the protection sheet 660.

In summary, the light guide panel 100 includes a plurality of light-receiving portions formed on the light-receiving surface 110 corresponding to the light sources, and prism patterns 120 formed on the light-receiving portions. The prism patterns 120 are formed using a mold that has prism pattern forming portions, which in turn are imprinted from the fine patterns formed on the pattern master using an electrolyzer containing electrolyte. Furthermore, a light path conversion means is formed on the bottom surface of the light guide panel to change the path of light to reduce its angle of incidence on the light guide panel surface by scattering, diffraction, or the like. For instance, a scattering pattern for scattering light, a hologram pattern for diffracting light, or a prism pattern for concentrating light can be used as the light path conversion means.

For the light sources 610, point light sources such as LEDs may be used. The light sources 610 are installed at positions that correspond to the light-receiving portions 120 of the light guide panel 100.

The reflection sheet 620 is installed under the light guide panel 100 to improve the light utilization efficiency by reflecting the light leaking through the bottom surface of the light guide panel 100.

The diffusion sheet 630 allows the light incident from the light sources 610 to be directed toward the front of a liquid crystal display panel (not shown) and causes the diffused light to radiate onto the liquid crystal display panel after diffusing the light to be uniformly distributed. Preferably, a film formed of a transparent resin having both surfaces coated with a predetermined material for light diffusion is used as the diffusion sheet 630.

The prism sheets 640 and 650 redirect the light that exits the diffusion sheet 630 at an angle so that it exits perpendicularly from the prism sheets 640, 650. This redirecting of the light increases light efficiency by making more of the light reach the liquid crystal display panel from a direction that is orthogonal to the panel surface.

The protection sheet 660 is installed over the prism sheet 650 to protect the prism sheet 650.

The bottom chassis 670 covers and protects the side and bottom surfaces of the light sources 610 and the light guide panel 100 and is formed in a rectangular parallelepiped box shape having an upper surface opened and a housing space with a predetermined depth defined therein.

According to the present invention as described above, a pattern master on which a fine pattern is formed and a side mold for forming a side surface of a light guide panel are dipped into electrolyte containing metal ions. A voltage is applied to the electrolyte and the side mold such that the fine pattern of the pattern master is transferred to the side mold with the metal ions contained in the electrolyte, forming a prism pattern forming portion on the side mold. The prism pattern is formed on a light-receiving portion of the light guide panel using the side mold on which the prism pattern forming portion is formed, thereby improving the shape accuracy and surface accuracy of the prism pattern.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the spirit of the appended claims.

What is claimed is:

1. A method of manufacturing a mold for producing a light guide panel, the method comprising:
    providing a pattern master on which a fine pattern is formed, wherein the fine pattern of the pattern master is formed to have a triangular or semicircular cross section;
    immersing the pattern master and a side mold for forming a light-receiving surface of the light guide panel in an electrolyte;
    placing the fine pattern of the pattern master in contact with the side mold; and
    applying a predetermined voltage to the electrolyte and the side mold, thereby transferring the fine pattern of the pattern master to the side mold with metal ions in the electrolyte.

2. The method of claim 1, wherein the fine pattern of the pattern master is the same pattern as a prism pattern that is formed on the light-receiving surface of the light guide panel.

3. The method of claim 1, wherein the pattern master includes an integrated piece having multiple concave portions.

4. The method of claim 1, wherein the providing the pattern master comprises manufacturing the pattern master by:
    forming a photosensitive film pattern including a plurality of triangular protrusions in a predetermined region on a substrate;
    forming a first resin layer of a uniform thickness on the photosensitive film pattern;
    forming a second resin layer on the first resin layer such that the second resin layer has a flat surface; and
    separating the first resin layer, the photosensitive film pattern, and the substrate from the second resin layer.

5. The method of claim 4, wherein the forming the photosensitive film pattern including a plurality of triangular protrusions comprises:
    depositing a photosensitive film on the substrate;
    placing a patterned mask on the photosensitive film;
    irradiating the patterned mask at a first angle with respect to an orthogonal axis to the surface of the photosensitive film;
    irradiating the patterned mask at a second angle with respect to the orthogonal axis; and
    applying an X-ray developer to the photosensitive film.

6. The method of claim 1, wherein the providing the pattern master comprises:
    forming a resin layer on a substrate;
    forming a photosensitive film pattern for exposing the substrate in a predetermined region on the resin layer;
    etching the resin layer using the photosensitive film pattern as a mask to form a plurality of semicircle-shaped grooves; and
    removing the photosensitive film pattern.

7. The method of claim 1, wherein a region of the side mold to which the fine pattern of the pattern master is transferred is a protrusion from another surface.

8. The method of claim 1, wherein a region of the side mold around the regions to which the fine pattern of the pattern master is transferred and the voltage is applied is insulated.

9. A method of manufacturing a light guide panel, the method comprising:
    immersing a pattern master and a side mold in an electrolyte, wherein the pattern master has a fine pattern formed thereon, the side mold is designed to form a light-receiving surface on the light guide panel, and the fine pattern of the pattern master is formed to have a triangular or semicircular cross section;
    placing the fine pattern of the pattern master in contact with the side mold;
    forming a prism pattern forming portion on the side mold by applying a predetermined voltage to the electrolyte and the side mold so that the fine pattern of the pattern master transfers to the side mold with metal ions in the electrolyte;
    assembling the side mold, a top mold, and a bottom mold to form an enclosed cavity; and
    injecting a resin into the cavity.

10. The method of claim 9, wherein the bottom mold has a pattern that is designed to change a path of incident light, so that the pattern forms on a surface of the light guide panel.

11. The method of claim 10, wherein the pattern that changes the path of incident light is at least one of a scattering pattern, a prism pattern and a hologram pattern.

12. The method of claim 9, wherein the pattern master is an integrated piece.

13. A method of manufacturing a mold for producing a light guide panel, the method comprising:
    providing a pattern master on which a fine pattern is formed;
    immersing the pattern master and a side mold for forming a light-receiving surface of the light guide panel in an electrolyte;
    placing the fine pattern of the pattern master in contact with the side mold; and
    applying a predetermined voltage to the electrolyte and the side mold, thereby transferring the fine pattern of the pattern master to the side mold with metal ions in the electrolyte, wherein the providing the pattern master comprises:
forming a resin layer on a substrate;
forming a photosensitive film pattern for exposing the substrate in a predetermined region on the resin layer;
etching the resin layer using the photosensitive film pattern as a mask to form a plurality of semicircle-shaped grooves; and
removing the photosensitive film pattern.

14. A method of manufacturing a mold for producing a light guide panel, the method comprising:
providing a pattern master on which a fine pattern is formed;
immersing the pattern master and a side mold for forming a light-receiving surface of the light guide panel in an electrolyte;
placing the fine pattern of the pattern master in contact with the side mold; and
applying a predetermined voltage to the electrolyte and the side mold, thereby transferring the fine pattern of the pattern master to the side mold with metal ions in the electrolyte,
wherein the providing the pattern master comprises manufacturing the pattern master by:
forming a photosensitive film pattern including a plurality of triangular protrusions in a predetermined region on a substrate;
forming a first resin layer of a uniform thickness on the photosensitive film pattern;
forming a second resin layer on the first resin layer such that the second resin layer has a flat surface; and
separating the first resin layer, the photosensitive film pattern, and the substrate from the second resin layer.

* * * * *